United States Patent
Hollander et al.

(10) Patent No.: US 7,885,452 B2
(45) Date of Patent: Feb. 8, 2011

(54) COMMON IMAGE FORMAT FILE IMAGE EXTRACTION

(75) Inventors: Ronald Hollander, Walnut Creek, CA (US); Tami Shepard, Battle Ground, WA (US); Nick Carozza, El Sobrante, CA (US)

(73) Assignee: Bank of America Corporation, Charlotte, NC (US)

( * ) Notice: Subject to any disclaimer, the term of this patent is extended or adjusted under 35 U.S.C. 154(b) by 883 days.

(21) Appl. No.: 11/760,129

(22) Filed: Jun. 8, 2007

(65) Prior Publication Data

US 2008/0304769 A1   Dec. 11, 2008

(51) Int. Cl.
*G06K 9/00* (2006.01)
*G06Q 40/00* (2006.01)

(52) U.S. Cl. ............... 382/137; 382/305; 705/45

(58) Field of Classification Search ......... 382/112, 382/113, 115, 116, 135, 137, 139, 140, 155, 382/168, 181–182, 187, 190–203, 232, 260, 382/274, 276, 287, 294, 295, 305, 320, 321, 382/176; 705/45; 370/235; 718/101; 235/375
See application file for complete search history.

(56) References Cited

U.S. PATENT DOCUMENTS 5,237,157 A * 8/1993 Kaplan .................. 235/375
2004/0049773 A1 * 3/2004 Yotsukura ............... 718/101
2005/0216409 A1 * 9/2005 McMonagle et al. ........ 705/45
2006/0106717 A1 * 5/2006 Randle et al. ............ 705/45
2006/0133277 A1 * 6/2006 Carozza et al. ........... 370/235

OTHER PUBLICATIONS

International Preliminary Report on Patentability for PCT/US2008/066043, dated Dec. 11, 2009.
Website article, Check Image Import (CII), <http://www.carreker.com/main/solutions/payments/PIM/check_image_import.htm>, first published prior to the date of filing this application, 2 pages.
Website article, Check Works, Inc.: CIMS Utilities, <http://www.checkworks-inc.com/cims/index.html>, first published prior to the date of filing this application, 2 pages.
International Search Report and Written Opinion for PCT/US08/66043 dated May 19, 2009.

* cited by examiner

*Primary Examiner*—Seyed Azarian
(74) *Attorney, Agent, or Firm*—Banner & Witcoff, Ltd.

(57) ABSTRACT

A utility is presented that may be used to extract check images and/or other information directly from a Common Import Format File (CIFF) file for presentation to a user. The utility may be used in addition to, and indeed in spite of, an existing check management database system that stores information from an original CIFF file in an alternate form.

13 Claims, 3 Drawing Sheets

COMMON IMAGE FORMAT FILE IMAGE EXTRACTION

BACKGROUND

It is becoming increasingly common for banks or other financial institutions to handle electronic versions of physical checks. When a physical check is submitted to a bank, the bank may optically scan one or both sides of the physical check and store the images (front and back) as a single data file. The data file typically includes index information—information about the check, such as the parties involved, the check amount, the check date, the bank(s) involved, magnetic ink character recognition (MICR) information, and the like.

The data file containing one or both images and/or the index information is normally stored as a Common Import Format File (CIFF) file. CIFF is a widely-used format in the banking industry, and is normally used in conjunction with the well-known Check Image Export (CIE) system. CIFF files are used to pass check image and index information between systems and companies, and to customers.

CIFF files often have problems, especially with the images stored therein. Conventional check management systems convert the information in the CIFF files to a different format for database storage. For example, the Carreker Check Image Management System, also known as CIMS, is a check management system commonly used for this purpose. Unfortunately, when a problematic CIFF file has been provided to such database systems (such as one that is missing image tags or has improper image tags), the check management systems typically are unable to display the images that were originally in the CIFF file.

SUMMARY

Accordingly, it would be desirable to provide an easy way to extract and view images directly from a Common Import Format File (CIFF) file. A utility is presented that may be used to do just that—extract images and/or other information directly from a CIFF file for presentation to a user. The utility may be used in addition to, and indeed in spite of, an existing check management database system that stores information from an original CIFF file in an alternate form.

For instance, a method, system, and software is described, in which a Common Import Format File (CIFF) file is received, a first image is extracted from the CIFF file, and the first image is saved in a first image file separate from the CIFF file.

These and other aspects of the disclosure will be apparent upon consideration of the following detailed description of illustrative aspects.

BRIEF DESCRIPTION OF THE DRAWINGS

A more complete understanding of the present disclosure may be acquired by referring to the following description in consideration of the accompanying drawings, in which like reference numbers indicate like features, and wherein.

It is noted that the various drawings are not necessarily to scale.

DETAILED DESCRIPTION

The various aspects summarized previously may be embodied in various forms. The following description shows by way of illustration various examples in which the aspects may be practiced. It is understood that other examples may be utilized, and that structural and functional modifications may be made, without departing from the scope of the present disclosure.

Except where explicitly stated otherwise, all references herein to two or more elements being "coupled" to each other is intended to broadly include both (a) the elements being directly connected to each other, or otherwise in direct communication with each other, without any intervening elements, as well as (b) the elements being indirectly connected to each other, or otherwise in indirect communication with each other, with one or more intervening elements.

Figure 1:
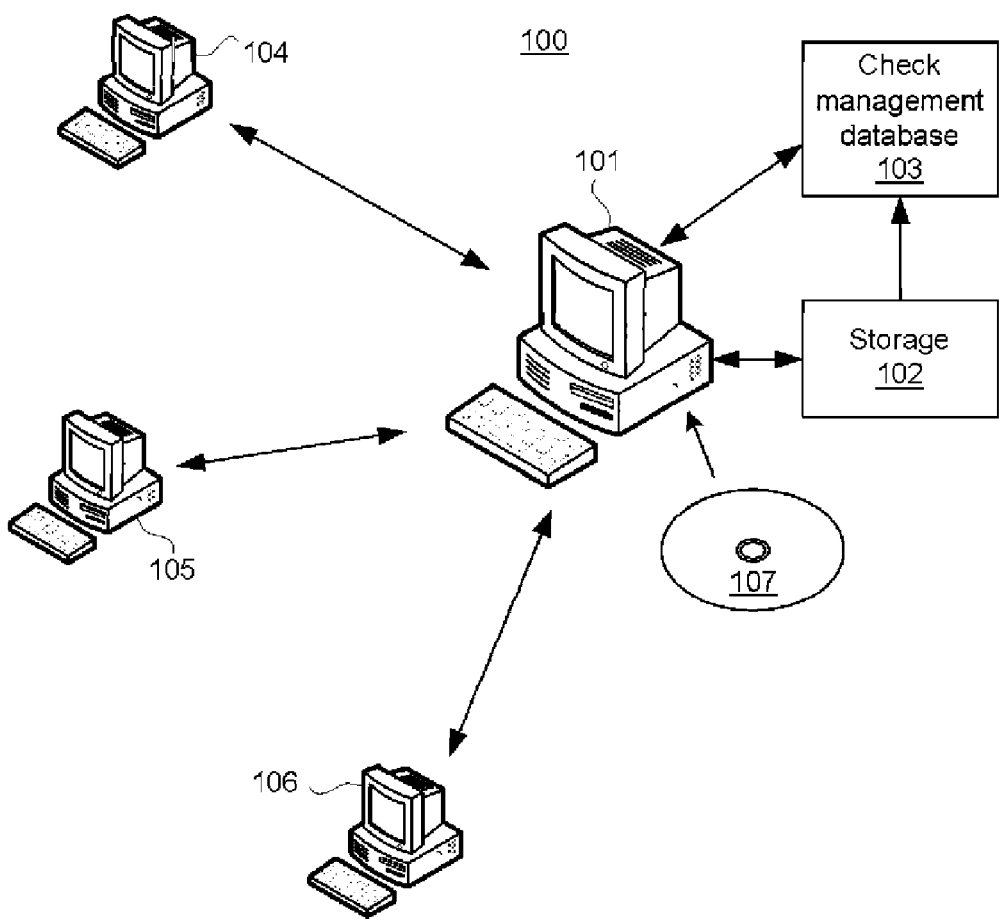
FIG. 1 is a functional block diagram of an illustrative system that may be used to store, extract, and/or present images from Common Import Format File (CIFF) files.

FIG. 1 is a functional block diagram of an illustrative system 100 that may be used to store, extract, and/or present images from Common Import Format File (CIFF) files. System 100 may be physically located at a single location, such as within a single building of a bank or other financial institution, or distributed among multiple locations over a larger geographical area. System 100 as shown includes a main computer 101, storage 102, a check management database 103, and one or more user computers 104, 105, 106.

Although main computer 101 is shown in FIG. 1 as a single personal computer, controller 101 may be embodied as any one or more computers directly or indirectly coupled together, such as one or more personal computers, mainframes, and/or servers. Main computer 101 may be programmable to execute computer-executable instructions (e.g., software). These computer-executable instructions may be stored and accessible to main computer 101 on one or more computer-readable media, such as storage 102 and/or another computer-readable medium such as a magnetic and/or optical disk 107 (e.g., a CD or hard drive). By executing the computer-executable instructions, main computer 101 may perform the various functions described herein.

Also, although user computers 104-106 are each shown as a personal computer, user computers 104-106 may alternatively be embodied as any one or more computers of any type directly or indirectly coupled together. Each of user computers 104-106 may also be programmable to execute computer-executable instructions (e.g., software). These computer-executable instructions may be stored and accessible to user computers 104-106 on one or more computer-readable media. By executing the computer-executable instructions, user computers 104-106 may perform their various functions described herein.

The various elements of system 100 may be coupled together as shown or in any other arrangement desired. The coupling of the various elements of system 100 may be coupled together, for instance, via a network such as a local area network (LAN) or a larger network such as the Internet especially where the elements of system 100 are spread over a large geographical area.

Storage 102 and/or check management database 103 may each include any one or more computer-readable media for storing data and/or computer-executable instructions. Such computer-readable media may include, for example, one or more magnetic disk drives, optical disk drives, and/or tape drives, and may be configured to store a large amount of data, on the order of gigabytes, terabytes, or more. Storage 102 may be used to store, for instance, raw CIFF files, whereas check management database 103 may be used to store, for instance, data from those CIFF files stored in a different non-CIFF format.

In addition, storage 102 and/or check management database 103 may each include one or more computers for implementing a database that relates various portions of the data stored in storage 102 and/or check management database 103 with other portions of the data stored in storage 103 and/or check management database 103. Alternatively, the databases therein may be implemented by main computer 101. In either case, main computer 101 and/or user computers 104-106 may generate and/or receive a query that is processed by the database in storage 102 and/or in check management database 103 to selectively return stored data responsive to the query.

An overview of illustrative system 100 is as follows. CIFF files are received and stored as CIFF files in storage 102. A check management system, such as the Carreker Check Image Management System (CIMS), may convert the data in these CIFF files into a proprietary data format and organize this converted data as a database, which is stored in check management database 103. The check management system may be implemented as computer-executable software on main computer 101 and/or on check management database 103.

Normally, computer 101 may query check management database 103 for information about certain checks, such as the scanned images of those checks. Viewer software on computer 101 that is compatible with (or even part of) the check management system would normally receive these images from the check management database 103 and display the images to the user. However, occasionally the original CIFF files may be corrupted or have some other problem. For example, the images in the CIFF files may be stored as tagged images, such as in Tagged Image File Format (TIFF) format, and one or more of the tags for an image may be missing or in error. In such a case, the viewer has typically been incapable of displaying that image.

After the conversion of the CIFF files to check management database 103, the CIFF files remain in storage 102. Accordingly, it may be desirable to obtain the images directly from the original raw CIFF files in storage 102 and extract the original image data from these CIFF files for analysis. Thus, the check management system may be bypassed for purposes of obtaining the original image data, using an image extract utility.

Figure 2:
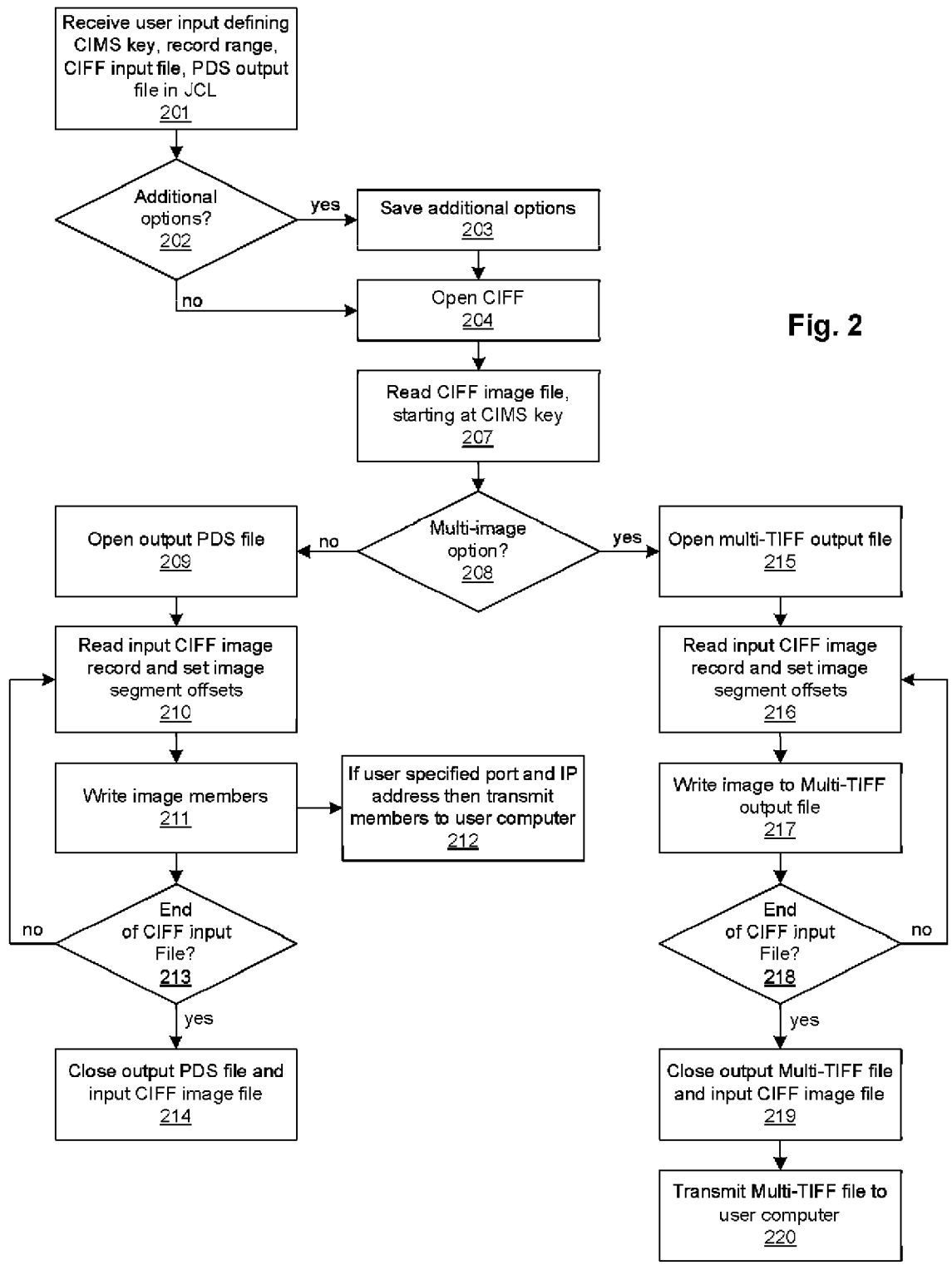
FIG. 2 is a flow chart of an illustrative method that may be performed to extract and present images from CIFF files.
Figure 3:
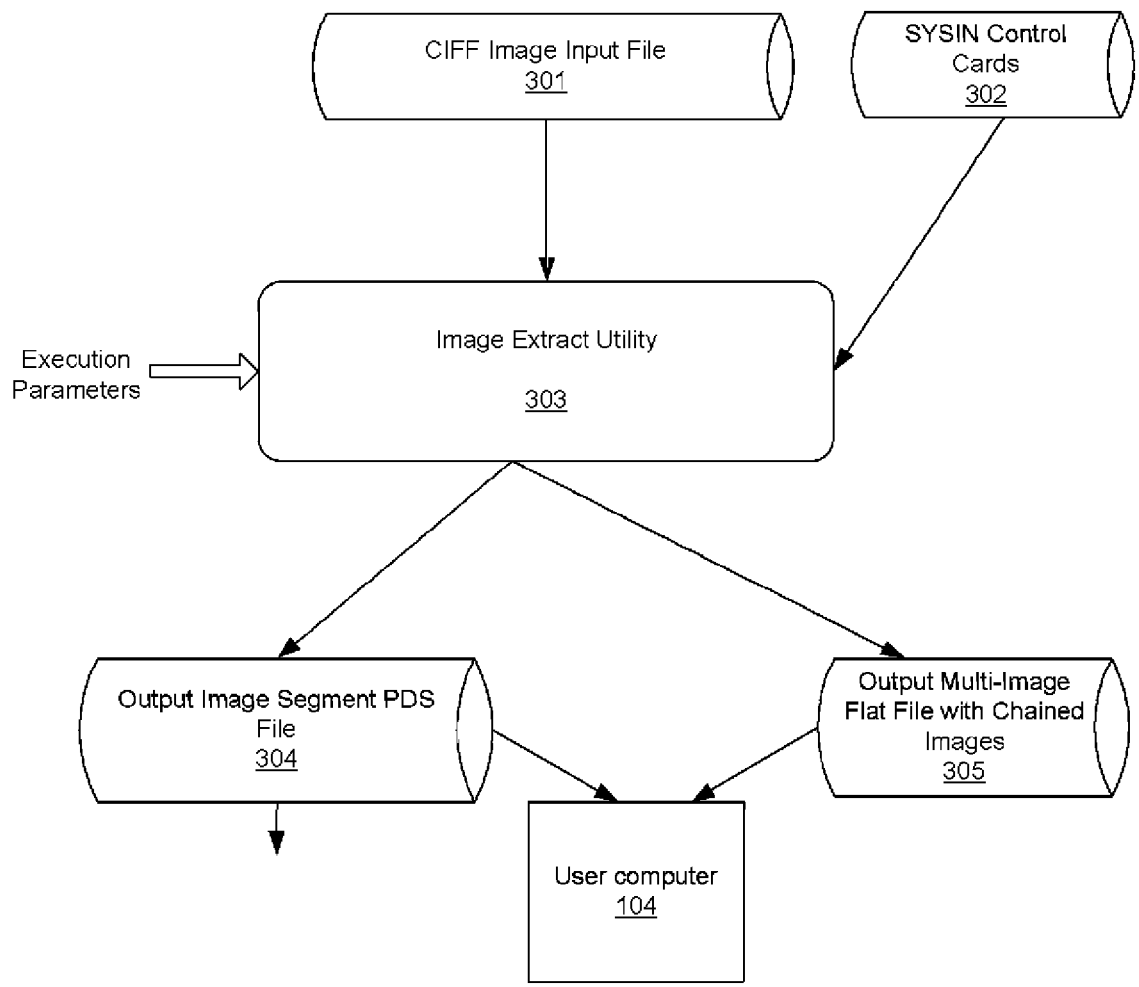
FIG. 3 is a functional block diagram of the method of FIG. 2.

FIG. 2 is a flow chart of an illustrative method that may be performed to extract and present images from CIFF files, without the need for using the check management system to obtain these images. FIG. 3 shows the process from a functional block diagram point of view. The various method steps may be performed by any one or more elements in system 100. For example, step 201 may be performed by user computer 104, and steps 202-217 may be performed by, for example, a software image extract utility 303 executed by main computer 101 and/or storage 102.

Although various steps are shown as separate steps in FIG. 2, these steps may be combined and/or further sub-divided in any manner desired. Also, the order of the steps may be rearranged as desired, steps may be added, and steps may even be skipped altogether.

There are a variety of user options that may be specified, such as in mainframe SYSIN control cards 302 to tell the image extract utility how to generate the output. For example, it may be desired that check image partition data set (PDS) members are generated starting at the top of, or other starting point within, the CIFF input file for a specified number of check images following the starting point. The starting point may be defined, for instance, by a specific and unique check image CIMS key. Where PDS members are desired, the PDS members may be transferred to one or more of user computers 104-106, which may be specified by the port and IP address in SYSIN control cards 302.

The user may alternatively specify in SYSIN control cards 302 that no PDS members should be written. In such a case, check image PDS members may be written to the one or more user computers 104-106 as separate flat files.

The user may still further specify that multiple images be saved together in a single multi-image TIFF file. Again, this may be specified in SYSIN control cards 302, which may drive the image extraction utility to generate only a single mainframe flat file containing all of the processed check images chained together into a multi-image TIFF (also referred to as a multi-TIFF) file, which may be transferred to one or more user computers 104-106. This multi-image option may enable the user to view all of the generated images merely by selecting the single multi-image TIFF file on the user computer using a standard image viewer, such as those currently marketed by Microsoft Corporation and offered with WINDOWS operating systems.

An example of how some of these options may be processed is now described with reference to FIG. 2.

In step 201, one of computer 101, 104, 105, 106 receives a user input requesting that one or more images be extracted from one or more CIFF files 301. Where main computer 101 is a mainframe computer, the user input may be communicated to main computer 101 in the form of, for example, one or more SYSIN control cards 302. The user input may identify a particular one or more CIFF files, one or more portions within the CIFF file(s) where the images may be found, and/or the images themselves.

For example, the user input may identify one or more CIFF input files from which records are to be read, one or more record starting points within the CIFF files (e.g., one or more CIMS keys where the check management system used is CIMS), and/or a record range (e.g., the number of records to be read beyond the starting point). Rather than identifying specific records within a CIFF file, the user input may identify all records (or at least all image records) within the CIFF file. The user input may further identify one or more output files to which the images may be sent. For example, where the computer performing the image extraction (e.g., main computer 101) is a mainframe system, the user input may define that the one or more images be stored as one or more members in one or more particular partition data sets (PDSs) in job control language (JCL).

The user input may also specify one or more options in SYSIN control cards 302, such as those described previously. In step 202, it is checked whether any of these options are specified.

If options were specified, then these options are saved in step 203. Otherwise, the process skips to step 204, in which the identified input CIFF file (or files) is found in storage 102 and opened for reading.

The opened input CIFF file is then read in step 207. The reading may begin at the record starting point identified by the user input (such as starting at the top or at the identified CIMS key), and as will be discussed with regard to steps 209-214 or steps 215-220, may continue for the record range identified by the user input.

In step 208, it is determined whether the user input included an option to store multiple image records into the same output file. If so, then step 215 is performed. If not, then step 209 is performed.

Steps 209-214 extract and save each image record in the input CIFF file to a PDS file. In step 209, the output PDS file is opened. In step 210, the next CIFF image record is read (beginning with the first image record indicated by the user input). In step 210, the appropriate input CIFF image record is read, and image segment offsets are set.

In step 211, the appropriate image members are written. The image extract utility may use the PDS file to write out check image segment members for each check image it processes from the CIFF input file. A check image contains multiple segments that define how to render the front and back of the check, a directory segment that defines where the segments start and end, and an image header segment for the check. Each check segment may be written out to the PDS as a member. For example, for one check there may be as many as seven members in the PDS for that check. A status member is also included for the check image, which defines the unique CIMS key for the check along with the segment length and offset of each image segment (segments 0, 1, 2, 3, and/or 4). As an example, one or more of the following image members may be written to the PDS, along with their respective illustrative member names:

M00002CF: check image header segment;
M00002DI: check image directory segment;
M00002ST: status segment;
M00002S0: check image segment 0;
M00002S1: check image segment 1 (i.e., the front of the check); and
M00002S3: check image segment 3 (i.e., the back of the check).

In step 21, if the user has specified a destination to which the PDS members should be sent, then they are sent to that destination. For instance, each node on the network of system 100 may have a network address (e.g., internet protocol, or IP, address) and/or port that may be unique to that node within the network. Main computer 101 may thus select the network address and/or port of the destination (e.g., user computer 104). This destination network address may be indicated by the user input.

In step 213, it is determined whether another image record is to be read in accordance with the indicated record range. If so, then the process moves to step 210. If not, then the process moves to step 214. In step 214, all input and output files are closed, and any TCP/IP sockets are also closed as appropriate.

Steps 215-220 extract and save each image record in a CIFF file to the same common output file. In step 215, a multi-image TIFF output file is opened.

In step 216, the next CIFF image record is read (beginning with the first image record indicated by the user input), and image segment offsets are set. In step 217, the read image is written to the multi-image TIFF output file.

In step 218, it is determined whether another image record is to be read in accordance with the indicated record range. If so, then the process moves to step 216. If not, then the process moves to step 219. In step 219, all input and output files are closed. In step 220, the output file containing multiple images then may be sent to the appropriate selected network address.

The output file may be sent to and/or otherwise made available to one or more of the user computers, such as user computer 104. The output file may be embodied as or contain one or more image files. Examples of such an image file includes, but is not limited to, a tagged image file such as a Tagged Image File Format (TIFF) file, and a non-tagged image file such as a Joint Photographic Experts Group (JPEG) file. Where the image file contains multiple images (such as in steps 213-216), the image file may be a multi-page TIFF file, for example, with each image on a different page. The image file may contain only the image itself and possibly other data directly related to the image such as image tags (such as in a TIFF file).

Thus, methods, systems, and software have been described that extract and view images directly from a Common Import Format File (CIFF) file. These described aspects may be used without the need to retrieve the information in the CIFF file from a check management system, thereby potentially providing greater flexibility in reviewing and analyzing check images.

What is claimed is:

1. A method, comprising:
receiving a Common Import Format File (CIFF) file;
extracting, by a computer, a first image from the CIFF file;
saving the first image in a first image file separate from the CIFF file;
extracting a second image from the CIFF file; and
saving the second image in the first image file,
wherein the first image file is a multi-page file, and wherein the first image is stored as a first page of the multi-page file and the second image is stored as a second page of the multi-page file.

2. The method of claim 1, wherein the first image file is a Tagged Image File Format (TIFF) file.

3. The method of claim 1, further comprising receiving user input specifying the CIFF file and a starting point within the CIFF file, wherein the first image is stored within the CIFF file at the starting point of the named CIFF file.

4. A method, comprising:
receiving a plurality of files each containing a plurality of check images and check data;
storing the plurality of files;
converting the plurality of files to a set of data in a database;
extracting, by a c a first check image of the plurality of check images from a first stored file of the plurality of the stored files;
storing the first check image in a first image file separate from the first stored file;
extracting a second one of the check images from the first one of the stored files; and
storing the second check image in the first image file,
wherein the first image file is a multi-page file and wherein the first image is stored as a first page of the multi-page file and the second image is stored as a second page of the multi-page file.

5. The method of claim 4, further comprising displaying the first image file.

6. The method of claim 5, further comprising:
finding the first check image in the database; and
displaying the first check image taken from the database.

7. The method of claim 4, wherein each of the check images is a Tagged Image File Format (TIFF) file.

8. The method of claim 4, wherein the first image file is a multi-page Tagged Image File Format (TIFF) file.

9. The method of claim 4, wherein the database is a database of a Carreker Check Image Management System (CIMS).

10. The method of claim 4, further comprising:
selecting a network address of a first computer from a plurality network addresses of a plurality of computers; and
sending the first image file to the network address of the first computer.

11. A computer-readable medium storing computer-executable instructions, the instructions when executed by a computer causing a method to be performed, the method comprising:

receiving a Common Import Format File (CIFF) file;
extracting a first image from the CIFF file; and
saving the first image in a first image file separate from the CIFF file, and extracting a second image from the CIFF file; and
saving the second image in the first image file,
wherein the first image file is a multi-page file, and wherein the first image is stored as a first page of the multi-page file and the second image is stored as a second page of the multi-page file.

12. The computer-readable medium of claim 11, wherein the first image file is a multi-page Tagged Image File Format (TIFF) file.

13. The computer-readable medium of claim 11, wherein the method further comprises receiving user input specifying the CIFF file and a starting point within the CIFF file, wherein the first image is stored within the CIFF file at the starting point of the named CIFF file.

* * * * *